(No Model.) 2 Sheets—Sheet 2.
E. W. MITCHELL.
ELECTRIC RAILWAY.
No. 490,975. Patented Jan. 31, 1893.
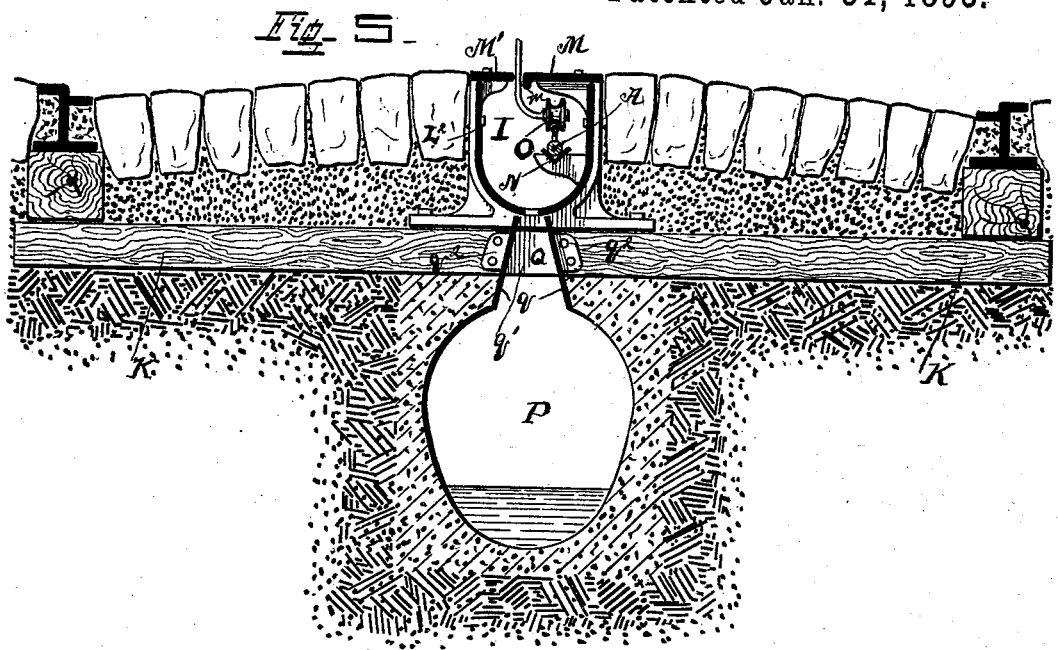
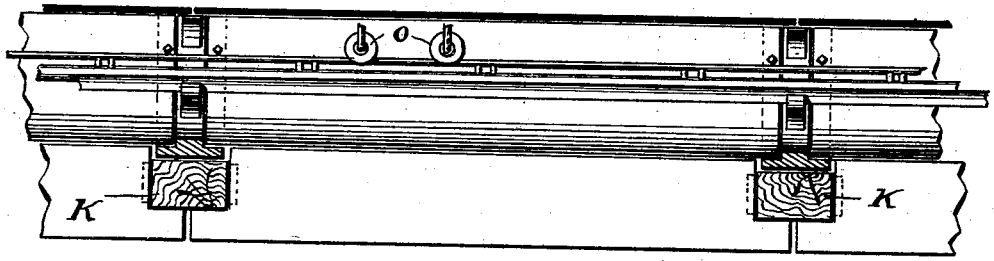
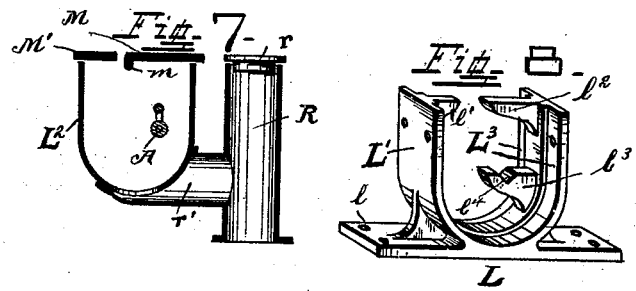
Attest
Chas. E. Riordon
H. W. Coffin
Inventor
Edward W. Mitchell
By Outhward & Dowell
his attys

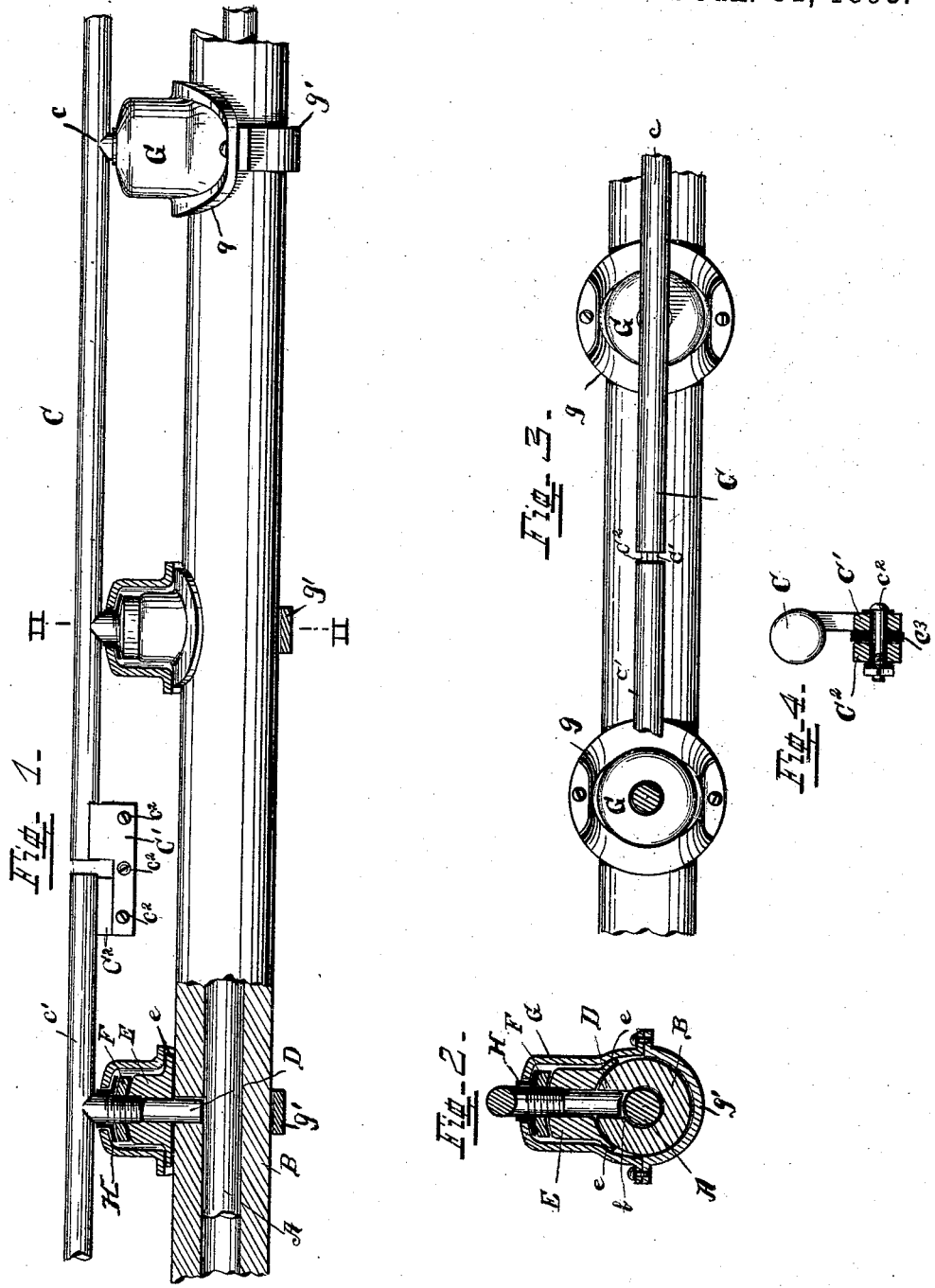

UNITED STATES PATENT OFFICE.

EDWARD W. MITCHELL, OF COVINGTON, KENTUCKY, ASSIGNOR TO THE MITCHELL-THOMPSON UNDERGROUND ELECTRIC CONDUCTOR COMPANY, OF WEST VIRGINIA.

ELECTRIC RAILWAY.

SPECIFICATION forming part of Letters Patent No. 490,975, dated January 31, 1893.

Application filed June 23, 1892. Serial No. 437,798. (No model.)

*To all whom it may concern:*

Be it known that I, EDWARD W. MITCHELL, a citizen of the United States, residing at Covington, in the county of Kenton and State of Kentucky, have invented certain new and useful Improvements in Electric Railways; and I do hereby declare the following to be a full, clear, and exact description of the invention, such as will enable others skilled in the art to which it appertains to make and use the same.

This invention relates to electric railways of that class in which the electric current is transmitted from a main line-conductor or feed-wire to motors on the moving vehicle or car by means of a sectional conductor, the sections of which are brought into electrical connection with the line-conductor successively during the advance of the car, so that the trolley or conducting terminal of the circuit on the car is in electrical connection with the line-conductor through one section of the service-conductor only while all the other sections of such conductor are out of contact with the feed-wire, thereby reducing the liability to leakage to a minimum.

My invention has particular reference to the application of electric conductors to conduits formed beneath the pavement of a street or roadway; the conduit being provided with an open slot through which the depending contact device or trolley arm may pass so as to establish communication between the feed-wire and the motors on the cars after the manner of an ordinary cable railway.

The invention will first be described in connection with the accompanying drawings and then pointed out in the claims at the end of this description.

Referring particularly to the drawings, in which similar letters of reference are used to denote similar parts, Figure 1, is a sectional side elevation of an electric conductor embodying my invention; Fig. 2, is a vertical cross section taken on the line II—II of Fig. 1; Fig. 3 is a plan of a broken section of the conductor; Fig. 4, is a detail sectional view illustrating the construction of the joint connecting two sections of the service-conductor; Fig. 5, is a transverse section through the conduit of an underground electric railway, showing my improvements applied thereto; Fig. 6, is a longitudinal sectional elevation of the same; and Figs. 7 and 8 are details of parts of the metallic conduit.

A denotes a main line-conductor or feed-wire which may consist of a continuous copper wire extending within an insulating tube or covering B, which latter may be incased in lead.

C, denotes a trolley wire which may consist of insulated sections $c$, $c'$, preferably about two or three feet in length, which are rigidly connected together, but insulated from each other, by means of insulated bolts $c^2$, $c^2$. This connection is preferably made by providing the adjacent ends of the sections $c, c'$, with depending metallic plates $C'$, $C^2$, respectively through which the insulated bolts $c^2$ may pass; insulating material $c^3$ being also placed between the plates $C'$, $C^2$. The sections $c, c'$, of the trolley wire are each provided with a plurality of contact posts or plungers D, which may be cast solid with the wire and extend through openings $b$, in the insulating covering B, in proximity to the feed-wire A.

E, denotes an elastic-bushing preferably of rubber having a flange $e$, encircling the lower end thereof and resting upon the insulation B, so as to support and retain the contact post D out of contact with the feed-wire in the normal position of the parts.

F denotes a dished nut or collar which is adapted to be screwed onto the upper screw threaded portion of the post D, and has a bearing upon the upper end of the rubber bushing E.

To bind the feed and trolley wire together and to hold them in proper position out of electrical contact, I provide a clamping device, which may consist of a hat-shaped upper portion G, embracing the contact post and rubber bushing and having a circular rim or flange $g$, which rests upon the flange $e$, of the rubber E, and a semi-circular piece $g'$, which passes beneath the insulation B; the two parts being bolted together as indicated in Figs. 1 and 2, so as to secure the feed-wire, the trolley-wire and the interposed rubber bushing in proper position, with a slight interval between the feed-wire and the contact post.

To prevent the escape of the fluid when contact is made between the contact post and the feed-wire, suitable insulating material H, may be interposed between the cap-piece F and the post and nut, as shown in Fig. 2. As thus constructed the rubber bushing E, and the trolley-wire are supported and held in proper position by the clamping device while the end of the post is held normally out of contact with the feed-wire by the rubber, but in position to be forced into contact therewith when the trolley-wire is depressed by the usual trolley wheel or contact device suspended from the car through the slot of the conduit.

The open slot conduit I, may be constructed in any well known manner similar to cable railways now in common use.

In the construction shown cross ties K, K, are laid at intervals along the line of the railway and on these ties are placed rigid metallic castings L of the construction illustrated in Fig. 8. The casting L, is preferably formed with a base plate $l$ having perforations therein to receive the fastening bolts by which it may be secured to the tie, and a U-shaped standard or yoke L', one arm of which is provided with an inwardly projecting arm or lug $l'$, while its opposite arm is provided with a pair of inwardly projecting arms or lugs $l^2$, $l^3$. The yoke L' is preferably recessed at each side as indicated at $L^3$, to form seats for the ends of cast iron plates or casings $L^2$, which are U-shaped in cross section and extend between the yokes L' to which they are secured by bolts passing therethrough and through suitable perforations in the yoke arms.

To form a cover for the conduit I provide metallic plates M, M', preferably of wrought iron rolled into proper shape; the plate M, being formed with a depending lip $m$, which prevents water from being conducted onto the conductor which is supported beneath the plate M, at one side of the conduit slot on the lugs $l^3$. The lugs $l^3$ may have notches $l^4$, to receive angle-iron bars N, which extend between the castings and form a bed-rest or support for the conductor A, so as to hold the same in proper relation to the trolley or contact wheel O. I preferably use a double trolley or contact device having two contact wheels arranged one slightly in advance of the other, so as to insure metallic contact between the feed-wire and two or more contact posts so as to prevent arcing and consequent burning out of the metallic contacts.

P denotes a concrete conduit formed beneath the ties K, K, directly beneath the metallic conduit I, to receive the drippings from said metallic conduit; the U-shaped casings $L^2$ being formed with centrally disposed openings to allow the water, &c., to drip into the lower conduit which may connect with a sewer.

It is my intention to form these concrete conduits only at low places in the street, or at places where the ground is unusually wet or moist, and thereby to keep the upper conduit and the metallic conductors free from contact with the water.

To prevent the concrete conduit from caving in or collapsing I place between each pair of ties a metallic box-like casting Q, which consists of two separated side plates $q$, $q$, formed integrally with end plates $q'$, $q'$, arranged at right angles thereto and having perforated portions $q^2$, $q^2$, to receive bolts or screws for securing said plates to the ties.

In more elevated places the concrete conduit is not required and instead thereof I propose to employ suitable traps, which may consist of a short cylinder R, having an open top with cover $r$, thereon, flush with the surface of the street, the pipe R being adapted to connect with a sewer pipe if desired, and having a lateral branch $r'$ communicating with an opening in the bottom of the casting $L^2$, to receive the washings therefrom. This contrivance affords a ready means of cleaning the conduit without exposing the workman to the danger of coming in contact with the conductor.

By locating the conductor in an elevated position at one side of the conduit and beneath the surface plates M, M', it is kept out of contact with water in the bottom of the conduit and protected from water and dirt passing from the street through the open slot. And by forming the metallic lined conduit with its open top flush with the street and provided with removable plates M, M', access may be had to the conduit without digging or tearing up the pavement as is necessary in systems of the usual construction.

The sectional conductor may consist of a series of spliced bars of any suitable conducting material, with insulation between the spliced parts, and the conductor may be bolted or otherwise secured in a fixed position within the conduit or upon suitable supports. The concrete conduit may be dispensed with.

In operation, the trolley or contact wheel depending from the moving vehicle and connecting with the wiring of the motor in the usual way travels along the rigid sectional conductor, passing successively from section to section, depressing the conductor and compressing the rubber bushings until the plungers or posts make contact with the exposed parts of the line-conductor through the openings formed in the insulating covering, and as the contact wheel advances the various contacts are broken by the rubber bushings and the conducting sections are elevated to normal position. By this arrangement the electric current is transmitted from the line conductor to the contact wheel and thence to the motor on the car through the insulated conducting sections independently and successively as the car moves over the track, but two or more plungers are constantly in contact with the main line-conductor so as to insure electrical connection between said conductor and the conducting section until the contact wheel has passed beyond such section and caused one or more of the plungers of the next succeeding section to make contact in the manner indicated, thereby preventing the formation of metallic arcs.

Having thus fully described my invention what I claim as new and desire to secure by Letters Patent of the United States, is:—

1. In an electric railway the combination with a main line-conductor or feed-wire extending within an insulating covering having openings therethrough at intervals, of a sectional service-conductor consisting of rigidly connected insulated sections extending along the line of said feed-wire in proximity thereto, each insulated section being provided with a plurality of contacts adapted to establish electrical connection between the same and said feed-wire, and means for yieldingly holding said contacts normally out of contact with said feed-wire, substantially as described.

2. In an electric railway, the combination with the insulated feed-wire, of the sectional service-conductor consisting of a series of rigidly connected conducting sections insulated from each other and provided each with a series of contact posts adapted to make contact with said feed-wire, and means for connecting said feed-wire and service-conductor and retaining said posts normally out of contact with the feed-wire in position to make contact therewith when pressure is exerted on said service-conductor, substantially as described.

3. In combination with the insulated feed-wire, and the sectional service-conductor, the contact post integral with said conductor and having the nut screwed thereon, the elastic cylinder interposed between said nut and feed-wire, and means for connecting said parts together so as to permit the rubber to yieldingly hold said post normally out of contact with said feed-wire, substantially as described.

4. In combination with the continuous line-conductor, having the insulating covering, the sectional service-conductor having upon each section a plurality of contact posts formed integrally therewith, the nuts screwed upon said posts, the elastic cylinders through which said posts pass interposed between said nuts and said insulating covering, and means for connecting and retaining said parts in their normal positions, substantially as described.

5. In combination with the line-conductor, the sectional service-conductor consisting of a series of rigidly connected insulated sections each provided with a plurality of plunger-contacts formed integrally therewith and means for yieldingly sustaining said contacts in normal position out of contact with said line-conductor, substantially as described.

6. In combination with the line-conductor, the sectional conductor having the plunger-contacts thereon, means for yieldingly holding said contacts in proximity to said line-conductors, and the clamping device consisting of a hat-shaped casting fitting about said plunger-contacts and a separable piece passing underneath said line-conductor and secured to said casting so as to connect and sustain the several parts in operative position, substantially as described.

7. In an electric railway, the combination of the conduit castings having the perforated base plates with U-shaped standards or yokes rising therefrom and provided with inwardly projecting lugs or conductor-supports, the removable cover, and the U-shaped metallic castings extending between the yokes and having their ends seated in recesses in the sides of the yokes, substantially as described.

8. In combination with the open-slotted continuous metallic trough-like conduit having openings in the bottom thereof at intervals, a second sub concrete conduit at corresponding intervals arranged below said openings, and the box-like castings interposed between said surface and sub conduits and extending between the ties so as to prevent the walls of the concrete structure from caving, substantially as described.

9. An open-slotted conduit for electric railways, comprising the cross-ties, the castings having the yoke arms with side recesses and inwardly projecting lugs thereon mounted on said ties, the U-shaped casings extending between said castings and having their ends seated in said recesses, and the detachable plates forming the cover for said conduit, substantially as described.

10. In combination with the line-conductor or feed-wire and its insulating covering having openings therein at intervals, the sectional service-conductor or trolley-wire provided with contact posts or plungers, the elastic bushings or coverings of insulating material through which the plungers pass, the nuts or collars on said plungers resting upon said bushings, and the clamping devices constructed in separable parts which embrace and clamp the feed-wire covering; one of said parts having a central opening to receive a bushing which projects therethrough and an arched portion or elevated bridge-piece spanning said opening and perforated to receive and serve as a guide for the plunger working therein, substantially as described.

In testimony whereof I affix my signature in presence of two witnesses.

EDWARD W. MITCHELL.

Witnesses:
CHAS. E. RIORDON,
J. E. BONNEY.